Feb. 19, 1957  W. B. HERNDON  2,781,682
TORQUE WRENCH DRIVEN BY FLUID COUPLING
Filed Feb. 28, 1955  2 Sheets-Sheet 1

INVENTOR
Walter B. Herndon
BY
T. L. Chisholm
ATTORNEY 2,781,682
Patented Feb. 19, 1957

2,781,682

TORQUE WRENCH DRIVEN BY FLUID COUPLING

Walter B. Herndon, Ann Arbor, Mich., assignor to General Motors Corporation, Detroit, Mich., a corporation of Delaware Application February 28, 1955, Serial No. 491,041

12 Claims. (Cl. 81—52.4)

This invention relates to torque wrenches and particularly to those having multiple spindles and is designed to provide an improved torque wrench which provides adequate and steady torque for setting screw-threaded fastenings while allowing the drive to slip when the fastening is tight.

Multiple spindle torque wrenches have been made for simultaneously driving several screw-threaded fastenings, letting the drive to each spindle slip as the fastening becomes tight. In such wrenches as have come to my attention it has been difficult or impossible accurately to control the final torque delivered by the respective spindles, and the drive connections or clutches have been subject to overheating. Overheating is destructive and causes variation in the final torque.

It is an object of my invention to overcome these disadvantages and to provide a multiple spindle wrench which delivers an accurate final torque to each spindle whether the values of torque supplied to the several spindles are identical or different, and to provide a wrench which can be simply and adequately cooled.

Figure 1:
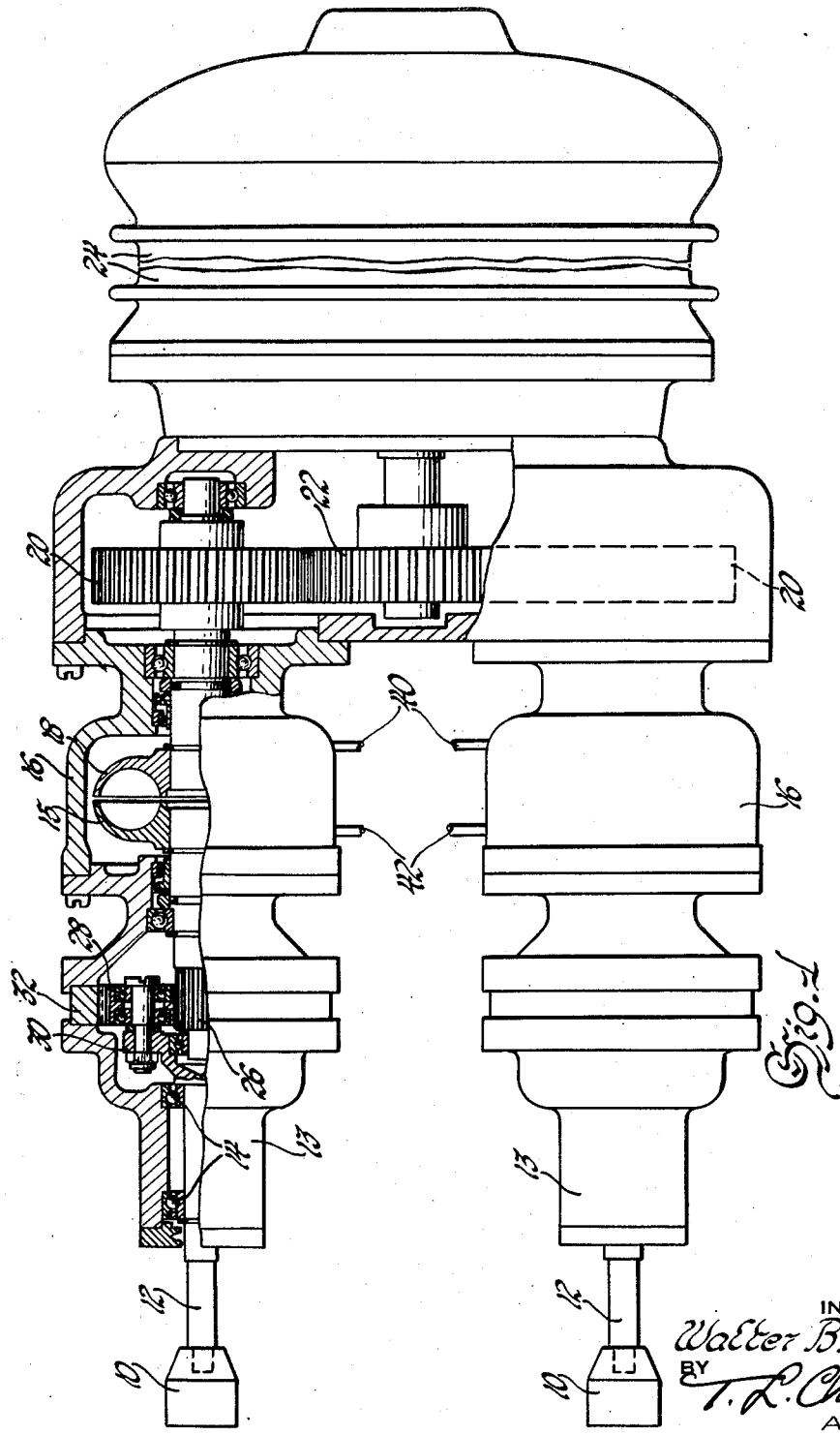
Figure 2:
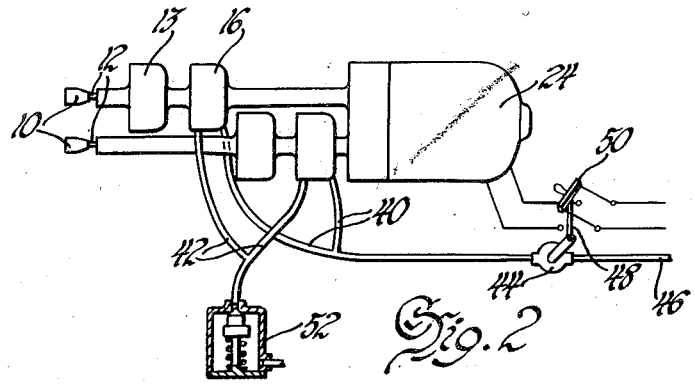
Figure 3:
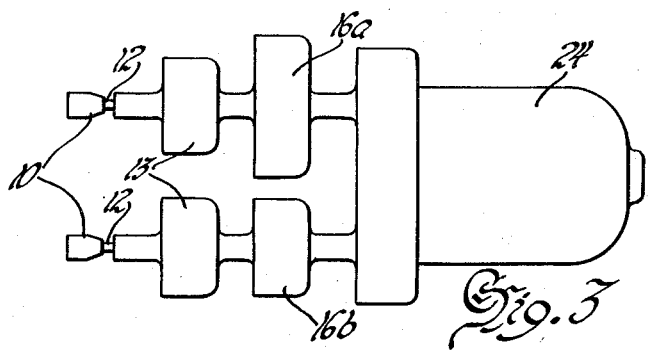
Figure 4:
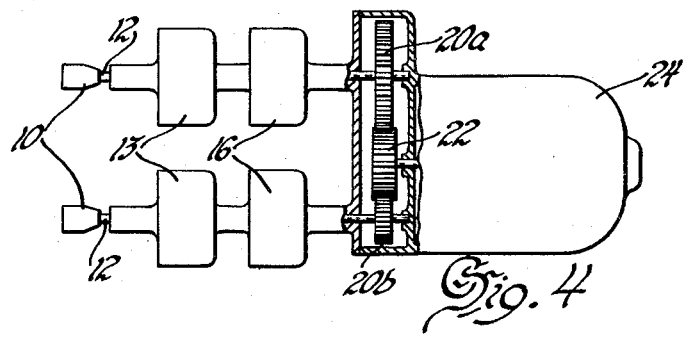

Other objects and advantages appear in the following description and in the accompanying drawings, in which Fig. 1 is an elevation partly in section of a torque wrench embodying one form of the invention, Fig. 2 is a diagrammatical representation of another form of the invention including means for the application of power and coolant, and Figs. 3 and 4 are diagrammatic representations of still other forms of the invention.

Certain features of the invention may be applied to a single spindle torque wrench, while the invention is applicable to a wrench having any desired number of spindles, two being chosen for illustration herein.

In Fig. 1 wrench sockets 10 are individually driven by drive shafts 12, suitably supported in gear casings 13, if desired, by anti-friction bearings 14. Each shaft 12 is driven by a continuously rotatable turbine 15 of a fluid coupling of any suitable known construction located in a coupling casing 16 filled with any suitable liquid, adjacent a continuously rotatable impeller 18 driven by an input gear 20. Both input gears mesh with a driving gear 22, which is suitably rotated by any suitable prime mover herein represented as an electric motor 24. Rotation of the input gears 20 rotates the turbines 15, as is well known.

If desired, the turbines 15 may be connected to drive the shafts 12 through any suitable speed reducing gearing, for example, the planetary gearing shown in Fig. 1 in which a sun gear 26 is driven by the turbine to cause the planetary pinions 28 on the carrier 30 to roll around the fixed reaction ring gear 32 and so drive the carrier, which is connected to the output shaft 12, at a speed less than that of the sun gear.

The sockets 10 are applied simultaneously to a pair of screw-threaded fastenings, such as bolts or nuts, and rotate each fastening until it is tight. As each fastening becomes tight, it stalls and holds fast the turbine of its fluid coupling. The impeller continues to rotate at its standard speed, slipping past the turbine and impressing on the fastening what is called the stall torque of the fluid coupling, multiplied by the torque ratio of the speed-reducing gearing.

The stall torque of a fluid coupling is the torque supplied by its turbine when held fast while the impeller rotates at standard speed. The stall torque for any given speed of rotation of the impeller is ordinarily a constant for the coupling, and is determined by factors such as diameter of the coupling, the design of its blades, and other features of construction, as known in the art. Also the stall torque may be varied by varying the speed of the impeller.

In accordance with my invention I construct the fluid couplings and their input or output gearing to deliver a stall torque which, taking into account the torque multiplication of the speed-reducing output gearing, if any, delivers to the sockets 10 the desired torque to set the fastenings. I can deliver identical final torque to all of the sockets 10 or I can deliver different torque to different fastenings by suitable combination of the characteristics of the fluid couplings.

Figure 3 illustrates diagrammatically one way of doing this. Fluid couplings having different diameters, represented by coupling casings 16a and 16b having different diameters, inherently deliver different values of stall torque to the spindles 12.

Another example is shown in Fig. 4, wherein different sizes of input gears 20a and 20b drive identical fluid couplings at different speeds to deliver different final or stall torque to the spindles. Still another way of delivering different final torque is to select reduction gears 26—28—32 having different speed ratios.

These arrangements are useful in simultaneously fastening a plurality of fastenings of different sizes requiring different setting torque, for example a ½" bolt and ⅜" bolt.

Rotation of the impeller with the turbine held fast generates heat in the fluid coupling. In order to remove this it may be desirable to circulate fluid through the coupling; for example, by piping water under pressure to an inlet 40 and allowing it to escape from an outlet 42. Conveniently, the flow of liquid may be started simultaneously with the application of power to the motor 24, as diagrammatically represented in Fig. 2, in which an inlet valve 44 in a supply conduit 46 is operated by a link 48 actuated by a switch 50 which starts the motor.

In order to prevent cavitation in the fluid couplings, particularly where water is used as the working liquid, it is desirable to maintain a pressure in the casing of the fluid coupling. This may be done in various ways, for example, by any suitable spring-loaded valve in the outlet 42, diagrammatically represented at 52 in Fig. 2. Cavitation is the phenomenon of vaporizing of the liquid at its operating temperature (below its boiling point) due to localized reduction of pressure caused by changes in flow speed, for example, when passing over the edges of vanes. Cavitation displaces liquid in the working space of the fluid coupling and reduces the torque of the coupling.

In the forms of the invention shown in Figs. 1, 3, 4 the size of the casings 13 or 16 limits the closeness of the spacing of the spindles 12 to a minimum dimension determined by the sum of the half-diameters of the casings. (This is not the same as the diameter of the casing when the casings are of different size.) This limitation is overcome in Fig. 2 by spacing the casings 16 out of alignment with respect to the transverse dimension of the assembly. In this arrangement the spindles may be placed closer together than the sum of the half-diameters.

I claim:
1. A torque wrench comprising in combination an assembly including a plurality of substantially parallel shafts for simultaneously turning a plurality of screw-threaded fastenings, a separate fluid coupling adapted to drive each shaft and having a casing enclosing an impeller and a turbine, and means for driving the impellers simultaneously, the casings being out of alignment transversely of the assembly to permit overlapping of the casings whereby the shafts can be disposed closer together than the sum of the half diameters of two adjacent casings.

2. A torque wrench comprising in combination a shaft for turning a screw-threaded fastening, a fluid coupling for driving the shaft, a motor for driving the fluid coupling, means for simultaneously supplying power to the motor and a continuous flow of liquid through the coupling and means for maintaining the liquid in the coupling at a pressure sufficient to prevent cavitation.

3. A torque wrench comprising in combination a shaft for turning a screw-threaded fastening, a fluid coupling for driving the shaft, a motor for driving the fluid coupling, means for simultaneously supplying power to the motor and a continuous flow of liquid to the coupling, and a pressure responsive outlet for liquid from the coupling adapted to maintain pressure in the coupling sufficient to prevent cavitation.

4. A multiple torque wrench comprising in combination a plurality of shafts for simultaneously turning a plurality of screw-threaded fastenings, a separate continuously rotatable turbine connected through speed-reducing means to drive each shaft, a separate continuously rotatable impeller adapted to circulate liquid through each turbine and forming with such turbine a hydrodynamic device for transmitting torque whose value is a function of the difference in the speeds of rotation of the impeller and turbine, and means for simultaneously rotating the impellers.

5. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, and means for simultaneously rotating the impellers at different speeds.

6. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, and means for simultaneously rotating the impellers at the same speed.

7. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, the stall torques of the hydrodynamic devices being of different values.

8. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, and means for simultaneously rotating the impellers.

9. A torque wrench comprising in combination a shaft for turning a screw-threaded fastening, a continuously rotatable turbine connected to drive the shaft, a continuously rotatable impeller adapted to circulate liquid through the turbine and forming with the turbine a hydrodynamic device for transmitting torque whose value is a function of the difference in speeds of rotation of the impeller and turbine, a casing inclosing the hydrodynamic device, a motor for rotating the impeller, and means for simultaneously supplying power to the motor and liquid to the hydrodynamic device.

10. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, a principal rotatable driving gear, and a plurality of secondary driving gears meshing with the principal gear, each of the secondary gears being connected to drive a separate one of the impellers.

11. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, a principal rotatable driving gear, and a plurality of secondary driving gears meshing with the principal gear, each of the secondary gears being connected to drive a separate one of the impellers, the speed ratios of the principal gear to each secondary gear being different.

12. A multiple torque wrench comprising in combination a plurality of shafts for simultaneously turning a plurality of screw-threaded fastenings, a separate continuously rotatable turbine connected to drive each shaft, a separate continuously rotatable impeller adapted to circulate liquid through each turbine and forming with such turbine a hydrodynamic device for transmitting torque whose value is a function of the difference in the speeds of rotation of the impeller and turbine, a principal rotatable driving gear, and a plurality of secondary driving gears meshing with the principal gear, each of the secondary gears being connected to drive a separate one of the impellers, the speed ratio of the principal gear to each secondary gear being substantially identical.

References Cited in the file of this patent

UNITED STATES PATENTS

| | | |
|---|---|---|
| 2,069,882 | Hall | Feb. 9, 1937 |
| 2,616,323 | Leifer | Nov. 4, 1952 |
| 2,627,770 | Hautau et al. | Feb. 10, 1953 |
| 2,649,870 | Keilien et al. | Aug. 25, 1953 |
| 2,651,228 | Taylor | Sept. 8, 1953 |
| 2,691,314 | Stevens et al. | Oct. 12, 1954 |
| 2,720,803 | Rice et al. | Oct. 18, 1955 |